United States Patent [19]

Adelson

[11] Patent Number: 4,780,838
[45] Date of Patent: Oct. 25, 1988

[54] HELICOPTER WEIGHT AND TORQUE ADVISORY SYSTEM

[75] Inventor: Richard L. Adelson, Augusta, Kans.

[73] Assignee: The Boeing Company, Seattle, Wash.

[21] Appl. No.: 761,691

[22] Filed: Aug. 2, 1985

Related U.S. Application Data

[63] Continuation-in-part of Ser. No. 688,533, Jan. 3, 1985, abandoned.

[51] Int. Cl.⁴ .................... G01G 19/00; G06F 15/20
[52] U.S. Cl. .................................. 364/567; 340/945; 73/178 H
[58] Field of Search ............... 364/463, 567, 433, 557; 73/65, 178 H; 340/945; 235/617; 177/25

[56] References Cited

U.S. PATENT DOCUMENTS

| | | | |
|---|---|---|---|
| 3,754,440 | 8/1973 | Edgerton et al. | 364/567 |
| 4,110,605 | 8/1978 | Miller | 364/463 |
| 4,463,428 | 7/1984 | Gilliam | 364/463 |
| 4,564,908 | 1/1986 | Clelford et al. | 364/433 |
| 4,574,360 | 3/1986 | Bateman | 364/567 |

OTHER PUBLICATIONS 1983, 2-page brochure to Clifton Precision, Litton Systems, Inc.
13-page brochure from Clifton Precision, ADC Model 8320000-01.

Primary Examiner—Gary Chin
Attorney, Agent, or Firm—Finnegan, Henderson, Farabow, Garrett & Dunner

[57] ABSTRACT

A helicopter weight and torque advisory system for connection to cargo hook load sensors, fuel flow, air temperature and altitude indicating systems of a helicopter. The advisory system provides the flight crew of the helicopter information as to available engine torque, gross weight, gross weight center of gravity condition, and weight supported by each cargo hook as an external sling load is raised and supported by the helicopter. Also information as to required engine torque for maximum helicopter range and endurance performance is provided.

7 Claims, 8 Drawing Sheets

REMAINING FUEL WEIGHT 3,200 LBS.
ALTITUDE 2,600 FT.
TEMPERATURE 29° C

FUEL FLOW RATE TO
LEFT ENGINE 1,500 LBS./HR. AND TO
RIGHT ENGINE 1,400 LBS./HR.

ANTI-ICE SYSTEM OFF

OPERATING WEIGHT 23,600 LBS.

OPERATING WEIGHT CG
AT STA 329.6 INCHES

RESERVE FUEL LEVEL 800 LBS.

TYPE OF ENGINES ARE L712

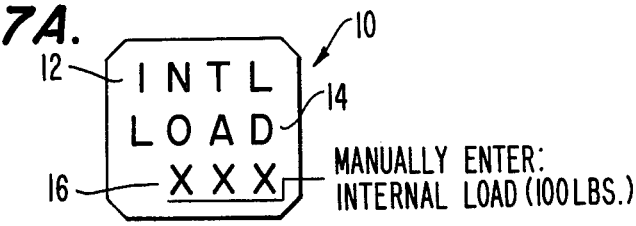

FIG. 7A. MANUALLY ENTER: INTERNAL LOAD (100 LBS.)

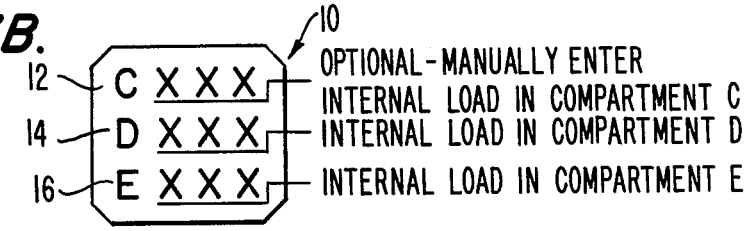

FIG. 7B. OPTIONAL-MANUALLY ENTER INTERNAL LOAD IN COMPARTMENT C / INTERNAL LOAD IN COMPARTMENT D / INTERNAL LOAD IN COMPARTMENT E

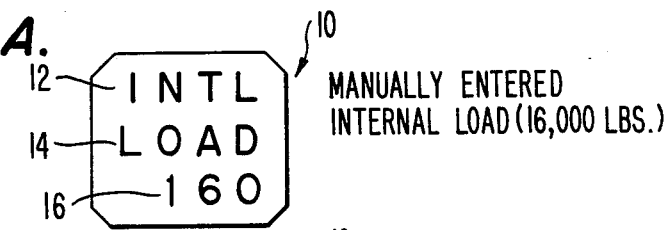

FIG. 8A. MANUALLY ENTERED INTERNAL LOAD (16,000 LBS.)

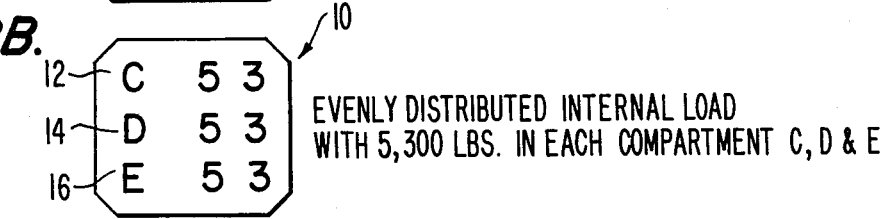

FIG. 8B. EVENLY DISTRIBUTED INTERNAL LOAD WITH 5,300 LBS. IN EACH COMPARTMENT C, D & E

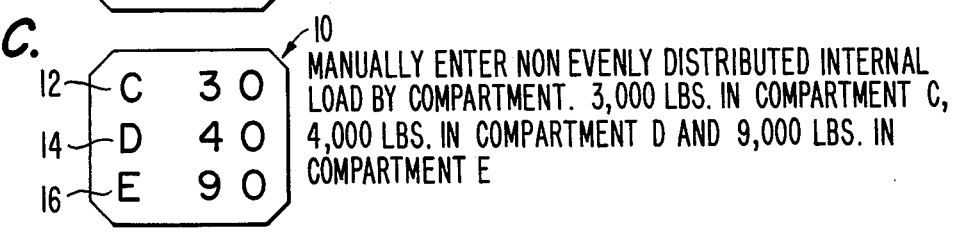

FIG. 8C. MANUALLY ENTER NON EVENLY DISTRIBUTED INTERNAL LOAD BY COMPARTMENT. 3,000 LBS. IN COMPARTMENT C, 4,000 LBS. IN COMPARTMENT D AND 9,000 LBS. IN COMPARTMENT E

FIG. 9A.

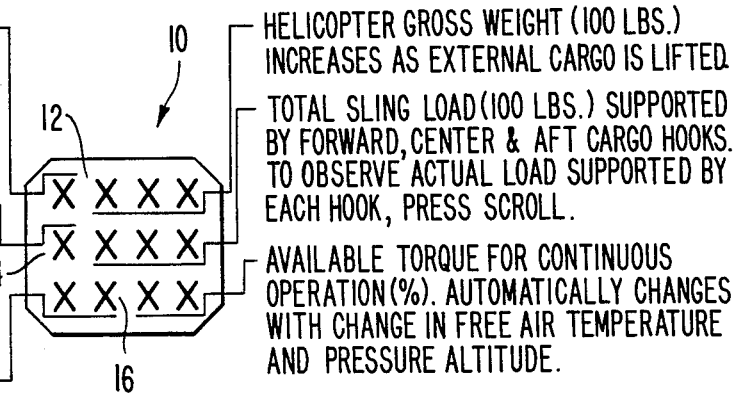

F (FORWARD CG) OR A (AFT CG) WILL APPEAR AND THE ENTIRE LINE 12 WILL FLASH TO ADVISE THE PILOT WHEN THE HELICOPTER'S FORWARD OR AFT CG LIMIT IS REACHED.

F (FORWARD HOOK), C (CENTER HOOK), OR A (AFT HOOK) WILL APPEAR & THE ENTIRE LINE 14 WILL FLASH TO ADVISE THE PILOT WHEN & WHICH HOOK LOAD LIMIT IS REACHED.

AVAILABLE TORQUE FOR LIMITED TIME OPERATION (%). AUTOMATICALLY CHANGES WITH CHANGES IN FREE AIR TEMPERATURE AND PRESSURE ALTITUDE.

HELICOPTER GROSS WEIGHT (100 LBS.) INCREASES AS EXTERNAL CARGO IS LIFTED.

TOTAL SLING LOAD (100 LBS.) SUPPORTED BY FORWARD, CENTER & AFT CARGO HOOKS. TO OBSERVE ACTUAL LOAD SUPPORTED BY EACH HOOK, PRESS SCROLL.

AVAILABLE TORQUE FOR CONTINUOUS OPERATION (%). AUTOMATICALLY CHANGES WITH CHANGE IN FREE AIR TEMPERATURE AND PRESSURE ALTITUDE.

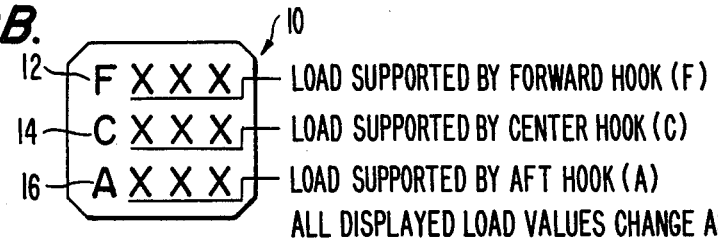
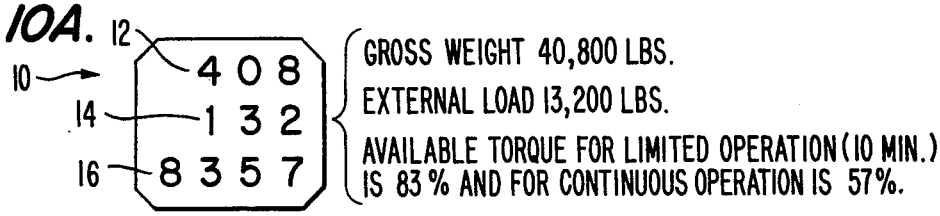
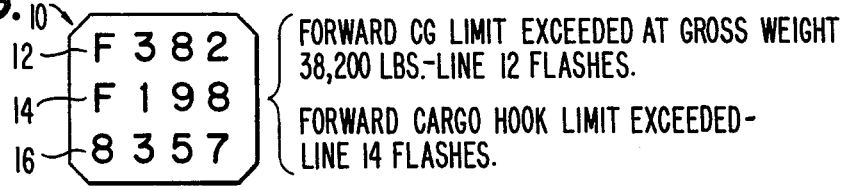
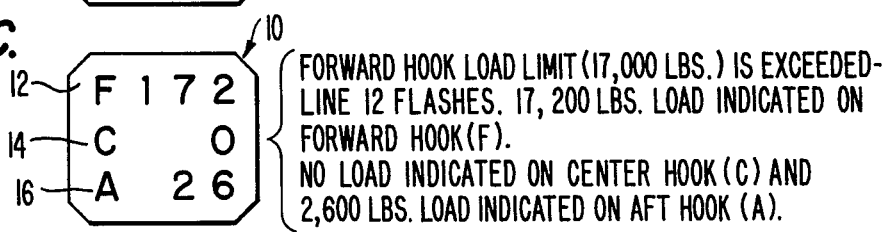
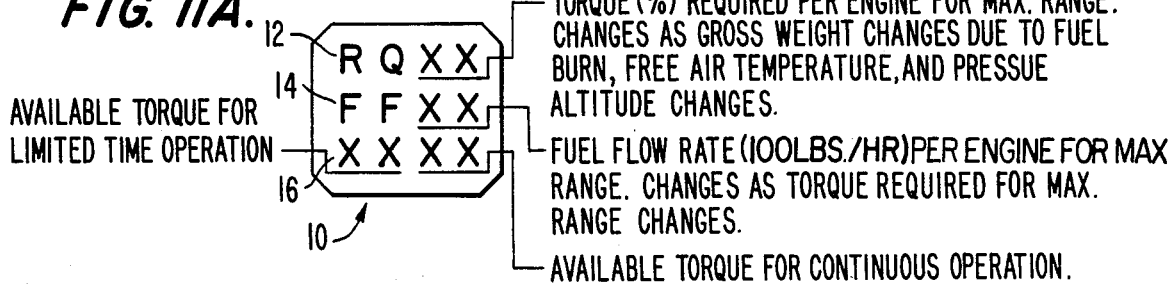
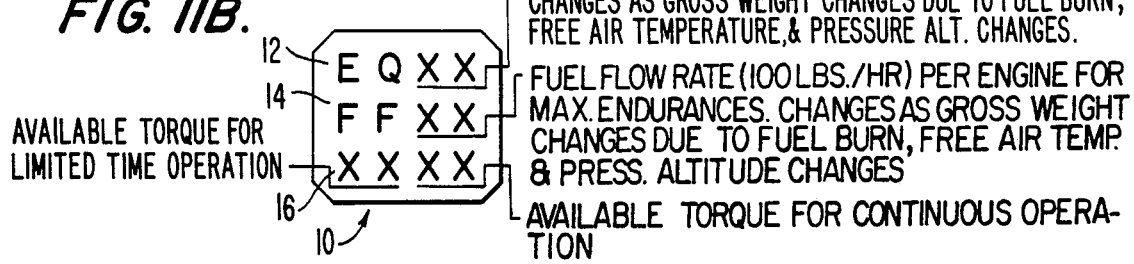

FIG. 12A. 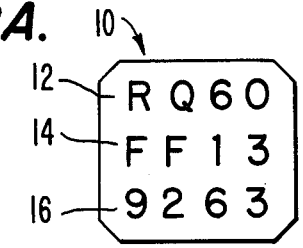

TORQUE REQUIRED PER ENGINE FOR MAX. RANGE AS A FUNCTION OF GROSS WEIGHT, TEMPERATURE, AND ALTITUDE IS 60%.

THE FUEL FLOW RATE PER ENGINE FOR MAX. RANGE IS 1,300 LBS./HR.

THE AVAILABLE TORQUE FOR A LIMITED OPERATION (10 MIN.) IS 92% & CONTINUOUS OPERATION IS 63%

FIG. 12B. 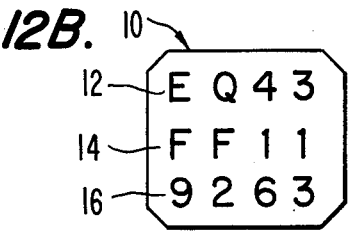

TORQUE REQUIRED PER ENGINE FOR MAX. ENDURANCE AS A FUNCTION OF GROSS WEIGHT, TEMPERATURE, AND ALTITUDE IS 49%.

THE FUEL FLOW RATE PER ENGINE FOR MAX. ENDURANCE IS 1,100 LBS./HR.

THE AVAILABLE TORQUE FOR A LIMITED OPERATION (10 MIN.) IS 92% & CONTINUOUS OPERATION IS 63%.

FIG. 13A. 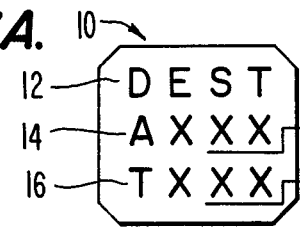

— ALTITUDE AT DESTINATION (100 FT.) MANUAL INPUT

— OUTSIDE AIR TEMPERATURE AT DESTINATION (°C) - MANUAL INPUT

FIG. 13B. 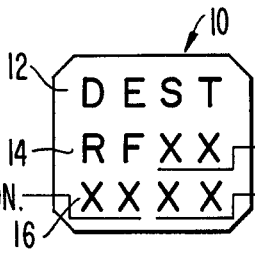

TORQUE AVAILABLE AT DESTINATION FOR LIMITED TIME OPERATION.

— REMAINING FUEL AT DESTINATION (100 LBS.) - MAN. INPUT

— TORQUE REQUIRED AT DESTINATION FOR LIMITED TIME OPERATION BASED ON ACTUAL EXTERNAL LOAD AND THE PROJECTED ALTITUDE, TEMPERATURE & REMAINING FUEL AT DESTINATION IF THE REQUIRED TORQUE IS GREATER THAN AVAILABLE TORQUE. THE REQUIRED VALUE WILL FLASH.

FIG. 14A. 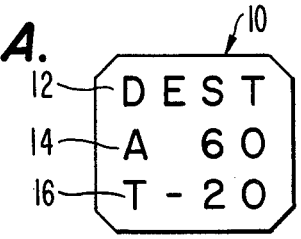

MANUALLY ENTERED ESTIMATED ALTITUDE OF 6,000 FT. AND TEMPERATURE -20°C AT DESTINATION

FIG. 14B. 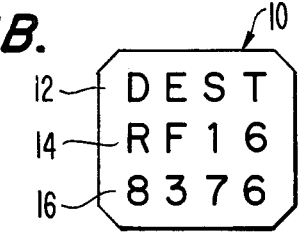

MANUALLY ENTER ESTIMATED FUEL OF 1,600 LBS. REMAINING AT DESTINATION.

COMPUTED AND DISPLAYED AVAILABLE TORQUE AND REQUIRED TORQUE AT DESTINATION FOR LIMITED OPERATION (83% IS AVAILABLE AND 76% IS REQUIRED).

HELICOPTER WEIGHT AND TORQUE ADVISORY SYSTEM

This application is a continuation-in-part of an application having the same title, Ser. No. 688,533 filed on Jan. 3, 1985 by the subject inventor, abandoned.

BACKGROUND OF THE INVENTION

The invention relates to a helicopter advisory system and more particularly, but not by way of limitation, to a system for providing to a flight crew the helicopter's "real time" available engine torque, gross weight, gross weight center of gravity condition, the total and individual weight supported by each cargo hook and optimum engine torque required for maximum range and endurance time performance.

Heretofore, helicopter pilots have not had an automated means of knowing "real time" available engine torque to use in conjunction with their engine torque meter when lifting external cargo loads or an advisory system to assist them in obtaining optimum helicopter performance as a function of actual external cargo loads. The present flying process requires observing helicopter instruments and then manually referring to performance hook up tables and charts for available engine torque and performance data. This process is time consuming, cumbersome and subject to error which contributes to helicopter structural damage, inability to complete missions and accidents.

Prior attempts to determine the helicopter condition during the lifting of external cargo did not incorporate the use of "real time" inputs for temperature and altitude to compute and display engine torque available.

The subject helicopter weight and torque advisory system eliminates the above-mentioned problems and provides unique features and advantages heretofore not available to flight crews during helicopter flight.

SUMMARY OF THE INVENTION

The helicopter weight and torque advisory system consists of two electronic components; a control panel with processor unit and a remote display unit. Electrical power, along with signals from the outside air temperature, pressure altitude, fuel flow and anti-ice systems and the external sling load cargo hook load sensors are fed into the control panel processor unit.

Prior to lifting an external cargo load the subject helicopter weight and torque advisory system displays to the pilot the available engine torque and then during the lifting of an external cargo load it will display in real time the helicopter gross weight and its total sling load weight. Further, the system will advise the pilot during the lifting operation when the gross weight, gross weight center of gravity, or a hook load limit is reached. After the load has been safely lifted the subject system will advise the pilot as to what his optimum engine torque and associated fuel flow rate should be for both maximum range and maximum endurance operations based on actual external load lifted, fuel remaining, altitude and temperature and status of anti-ice system. A degration in performance exists when the engine anti-ice system is on.

The operating weight empty and operating weight empty center of gravity location are manually entered and changed using the system processor's non volatile memory. Total fuel weight is entered manually at start of mission only if tanks are less than full. The remaining fuel value is automatically computed by the processor continuously throughout the mission from discrete signals supplied by fuel flow sensors.

The internal cargo load weight is inputed manually and is distributed evenly by the system processor over all cargo compartments. If the interal load should not be evenly distributed, individual compartment load weights may be entered manually.

The helicopter weight and torque advisory system also has the capability to compute and display the available versus required engine torque at selected destination points based on the helicopter's operating weight and internal payload in the processor's memory, the actual external cargo load lifted, and manually input projected altitude, temperature and remaining fuel at destination.

Another unique feature of the system is that the pilot can enter a desired fuel reserve level and the display will advise him when that level is reached.

The advisory system's memory has the capability to store different sets of performance data applicable to different types of engines that may be installed on a helicopter model. The operator may manually select the appropriate engine which is retained in memory automatically for future missions.

Upon command the system will display "real time" fuel remaining, fuel flow rate, altitude, temperature, the status of the anti-ice system and the actual load on each cargo hook. In addition, manually input and maintained data such as operating weight, operating weight center of gravity, reserve fuel level and type of engines in the processor's memory are available for quick display.

The control panel portion of the control panel and processor unit consists of an ON/OFF switch, three mode switches, i.e., internal cargo load (INTL), sling load (SLING), and engine torque at destination (DEST). Also, it contains a recall key (RCL), a test key (TEST) and a calibration key (CALB). Further, it includes three data keys, CHANGE, SCROLL and ENTER, and a remote display brightness control knob.

The remote display unit interfaces only with the control panel and processor unit. Its display consists of three lines with each line capable of displaying four alpha-numeric characters.

The remote display unit and control panel and processor unit are small for maximum utilization of existing available space without disturbing other equipment in the helicopter's cockpit.

The advantages and objects of the invention will become evident from the following detailed description of the drawings when read in connection with the accompanying drawings which illustrate preferred embodiments of the invention.

BRIEF DESCRIPTION OF THE DRAWINGS

FIGS. 7A and 7B illustrate the display formats when the internal load switch (INTL) is engaged.

FIGS. 8A, 8B and 8C illustrate example displays when the internal load switch (INTL) is engaged.

FIGS. 9A and 9B illustrate the display formats when the sling load switch (SLING) is engaged for external load lifting operations.

FIGS. 10A, 10B and 10C illustrate example displays when the sling load switch (SLING) is engaged for external load lifting operations.

FIGS. 11A and 11B illustrate display formats when the sling load switch (SLING) is engaged for maximum range and endurance operations.

FIGS. 12A and 12B illustrate example displays when the sling load switch (SLING) is engaged for maximum range and endurance operations.

FIGS. 13A and 13B illustrate the display formats when the destination switch (DEST) is engaged.

FIGS. 14A and 14B illustrates the example displays when the destination switch (DEST) is engaged.

FIGS. 17A and 17B together are a computational flow chart illustrating the operations of the processor unit of the invention.

DETAILED DESCRIPTION OF THE DRAWINGS

Figure 1:
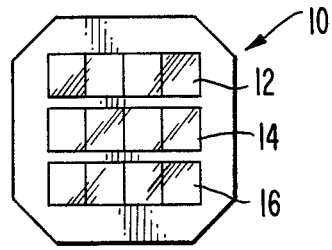
FIG. 1 illustrates the display arrangement of the remote display unit.

In FIG. 1 the remote display unit display is designated by general reference numeral 10. The display 10 includes three lines 12, 14 and 16 each capable of displaying four alpha-numeric characters.

Figure 2:
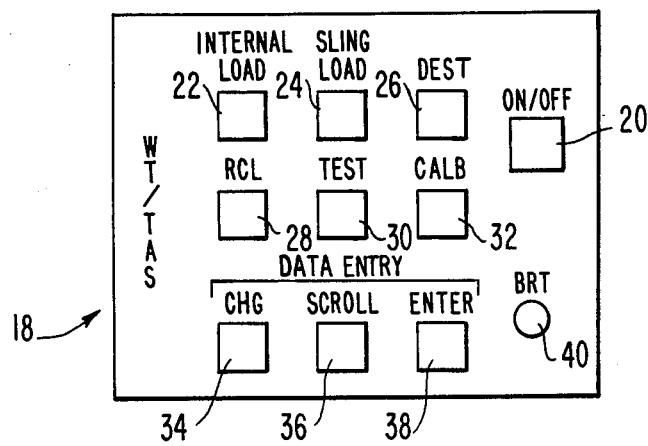
FIG. 2 illustrates the control panel of the control panel and processor unit.

In FIG. 2, the control panel and processor unit control panel is shown and designated by general reference 18. The control panel 18 includes an on/off switch 20 and three display mode switches, internal load (INTL) 22, sling load (SLING) 24 and destination (DEST) 26. A second line includes a recall (RCL) key 28, test key 30 and calibration (CALB) key 32. Further a third line includes three data entry keys, CHANGE 34, SCROLL 36 and ENTER 38. On the control panel 18 a display brightness control knob 40 is included for regulating the brightness from the remote display (10).

Figure 3:
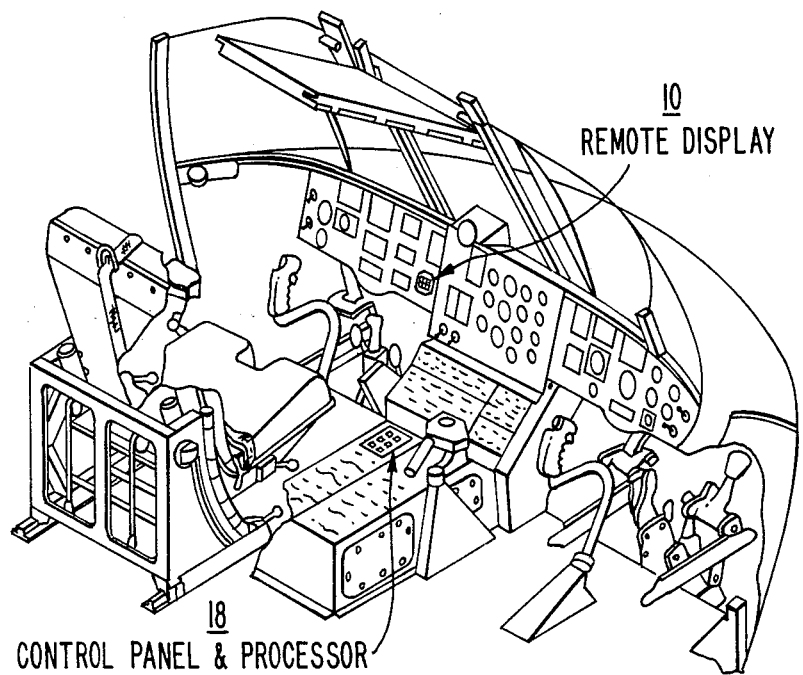
FIG. 3 illustrates a cockpit of a helicopter with the remote display unit and control panel and processor unit.

Illustrated in FIG. 3 is a cockpit of a U.S. Army CH-47D helicopter showing where typically, the remote display unit 10 and the control panel and processor unit 18 can be mounted. The remote display unit and control panel processor unit are small enough for potential installation in existing space without disturbing the various equipment used in a helicopter's cockpit.

Figure 4A:
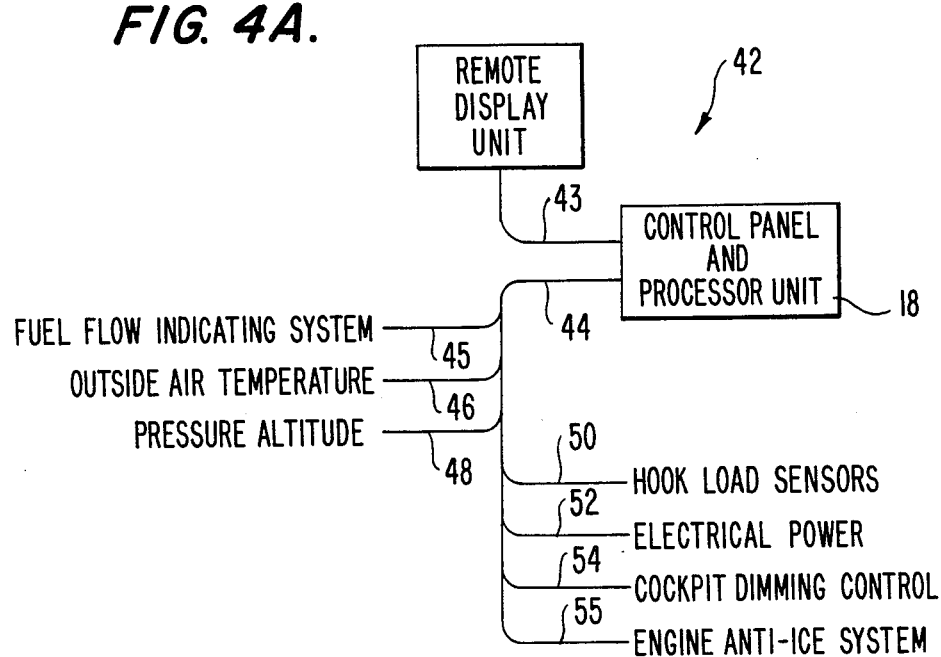
FIGS. 4A and 4B illustrate a system diagram of the advisory system and the control panel and processor unit and remote display unit electronic components.

In FIG. 4A a system diagram is shown which illustrates the interface between the helicopter weight and torque advisory system designated by general reference numeral 42 and other helicopter systems. In this diagram, the remote display unit 10 is shown connected to the control panel and processor unit 18 via lead 43. The unit 18 is connected via lead 44 to lead 45 which is attached to the fuel flow indicating system. Lead 44 is also connected to lead 46 attached to the outside air temperature sensor system, to lead 48 attached to the pressure altitude indicating system, to lead 50 attached to the cargo hook load sensors, to lead 52 attached to the electrical power system, to lead 54 attached to the cockpit dimming control switch and to lead 55 attached to the engine anti-ice system.

Figure 4B:
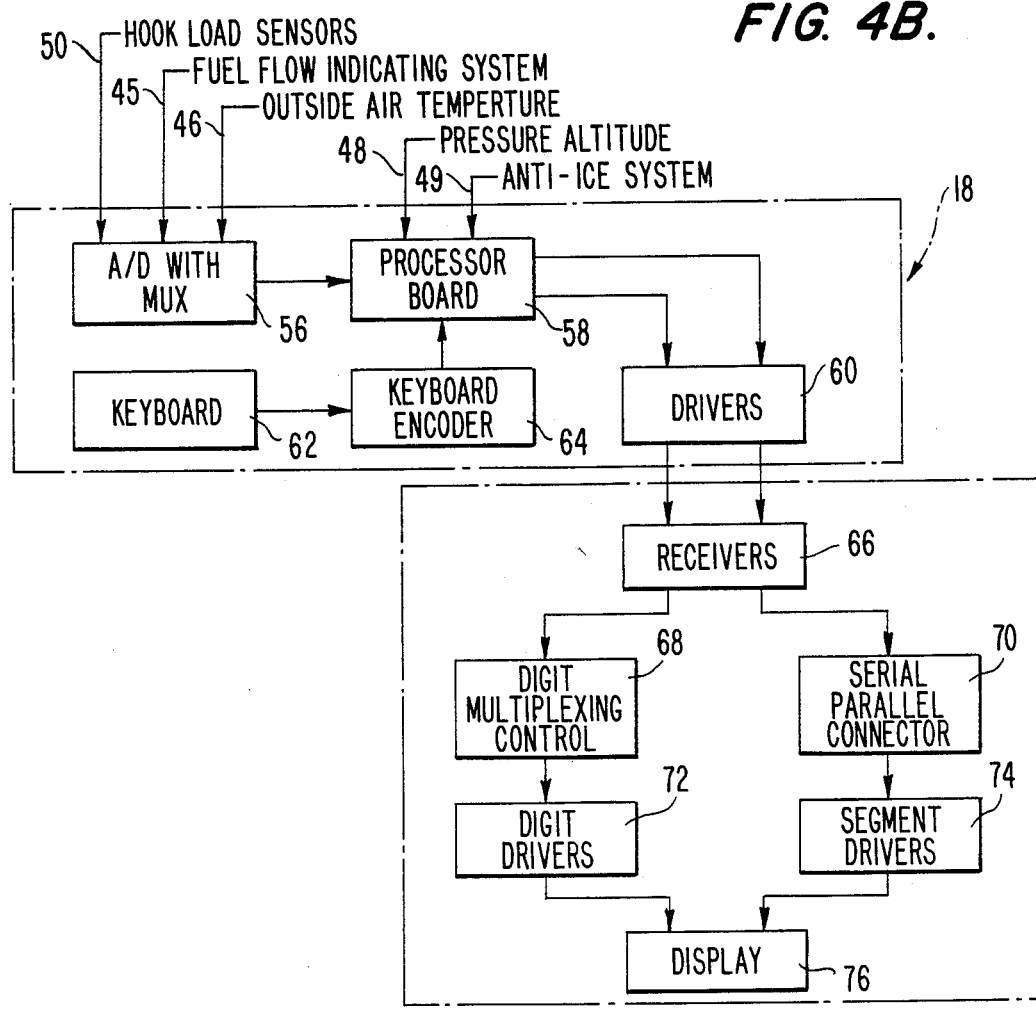

In FIG. 4B the example CH-47D system interface with the control and processor unit 18 is shown for storing and calculating the helicopter available engine torque, gross weight, gross weight center of gravity, weight supported by cargo hooks, and torque and fuel flow rate for maximum range and endurance time performance. The cargo hook load sensors, fuel flow and outside air temperature systems are connected to an analog to digital converter with multiplexer 56 via leads 45, 46 and 50. The converter 56 is connected to a processor board 58 which in turn is connected to drivers 60. The pressure altitude and anti-ice systems are connected directly to the processor board 58 via leads 48 and 49. A keyboard 62 of the unit 18 is connected to an encode 64 which in turn is connected to the processor board 58. The drivers 60 are connected to receivers 66 in the remote display unit 10. the receivers 66 are connected to a digit multiplexing control 68 and a serial parallel converter 70. The control 68 is connected to digit drivers 72 and the converter 70 is attached to segment drivers 74. The drivers 72 and 74 are connected to the display module 76.

Control panel and processor unit 18 is programmed to perform in accordance with the flow chart illustrated in FIGS. 17A and 17B. The computation functions of the processor are based on relationships known or available to those skilled in the art. Computation of exceeding hook weight limit, remaining fuel weight, helicopter gross weight, exceeding gross weight limit, and difference between destination available and required torque are mere addition or subtraction functions well within the skill of the art. Helicopter gross weight and its components, e.g., operating weight, fuel weight, etc. are known defined terms and relationships as apparent from Air Force Technical Manual T.O. 1-1B-50. Computation of gross weight center of gravity limits is data readily available from operating manuals for each type of aircraft; for the CH-47C helicopter, the CG limits are set forth in Army Manual TM 55-1520-227-10, FIG. 12-2. It is within the skill of the art to program a comparison of those limits to the computed CG. Computation of available torque for limited and continuous operation and of optimum or required torque and fuel flow rate for maximum range and endurance are based on graphical relationships available in operations manuals for each type of helicopter; for the CH-47D helicopter those relationships are available in Army Manual TM 55-1520-240-10.

Figure 5A:
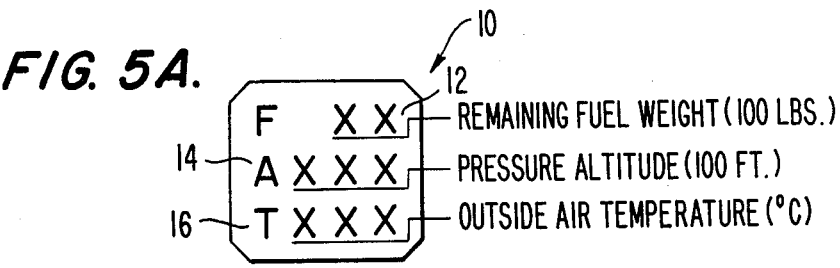
FIGS. 5A, 5B, 5C, 5D, 5E, 5F and 5G illustrate the display formats when the on/off switch is engaged.

Referring now to FIG. 5A and prior to the start of a mission, the operator turns the system on using the on/off switch 20 on the control panel 18. The display 10 will indicate the full fuel weight on the first line 12, pressure altitude on the second line 14 and the outside air temperature on the third line 16. If the fuel gauge indicates less than full the operator must input the indicated fuel gauge value into the system. The system will then automatically adjust the displayed total fuel remaining as fuel is consumed by the engines. The displayed altitude and temperature should agree with the altimeter and outside air temperature instruments.

Figure 5B:
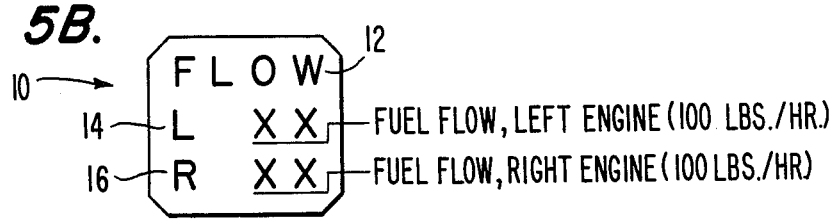
Figure 5C:
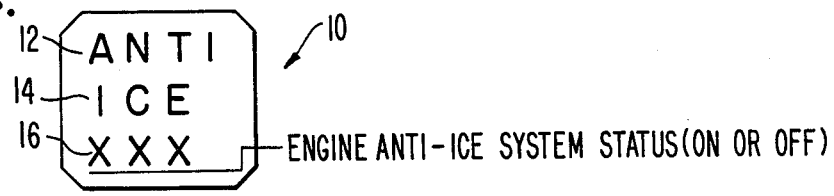

The operator would press the SCROLL key 36 on the control panel 18 to view the fuel flow rate FIG. 5B, which should agree with the fuel flow instrument, and the anti-ice system status display, FIG. 5C, which will indicate anti-ice system on or off.

The data entry keys on the control panel 18, i.e., CHANGE 34, SCROLL 36, and ENTER 38 are used to change the displayed data. The process for entering or updating the displayed data consists of pressing the change key 34 which starts the cursor of the display unit 10 blinking at the first data character position. If no change is required at this position, the operator then presses the enter key 38 and the cursor will shift to the next character position. If a character is to be entered or updated, the operator then presses the SCROLL key 36 to bring up the desired character and then the ENTER key 38 is pressed. The cursor will automatically at the end of the line, skip to the first data character on the next line.

Figure 5D:
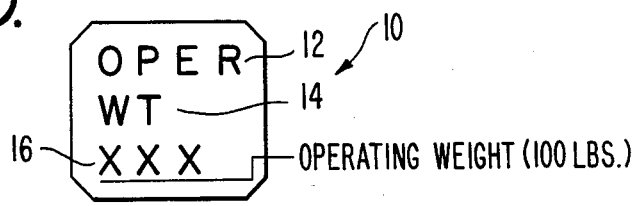
Figure 5E:
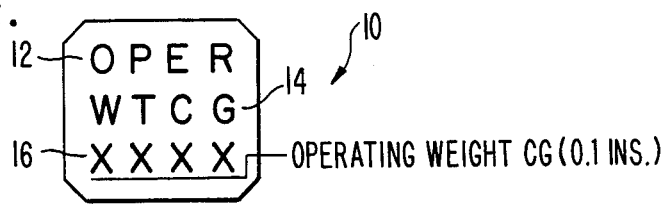

The manual inputs stored in the non volatile memory can be viewed by the operator by pressing the SCROLL key 36 on the control panel 18. The stored data consists of the helicopter operating weight (zero fuel and pay load), FIG. 5D, the operating weight center of gravity, (balance location), FIG. 5E, the reserve fuel level, FIG. 5F.

Figure 5F:
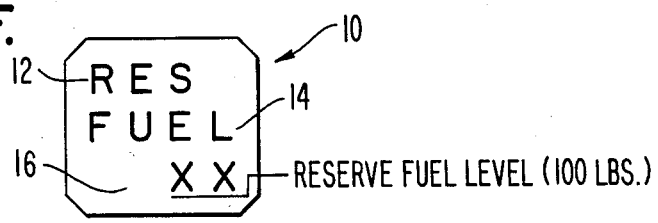

The reverse fuel level, FIG. 5F is inputed by the operator and will automatically appear and flash when reached. The default reserve fuel level is zero.

Figure 5G:
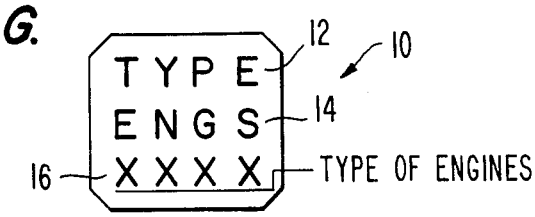
Figure 6A:
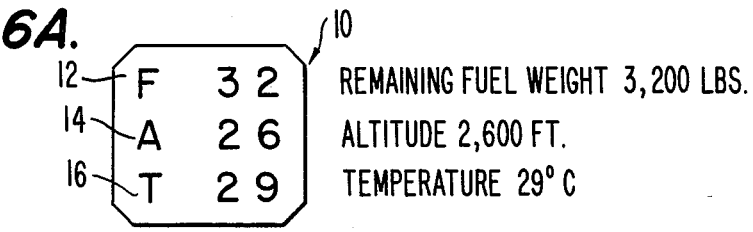
FIGS. 6A, 6B, 6C, 6D, 6E, 6F and 6G illustrate example displays when the on/off switch is engaged.
Figure 6B:
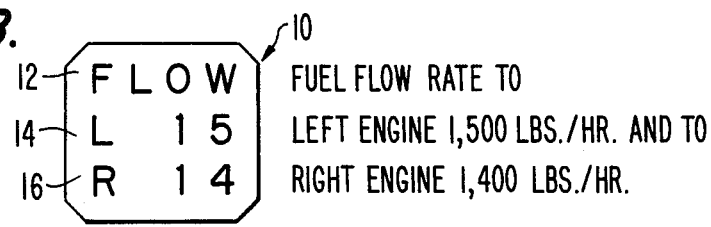
Figure 6C:
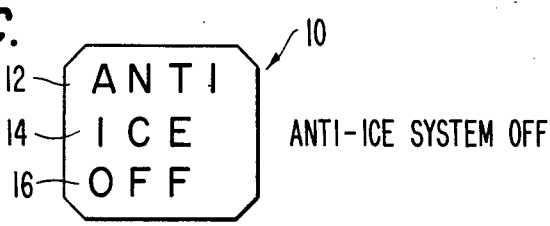
Figure 6D:
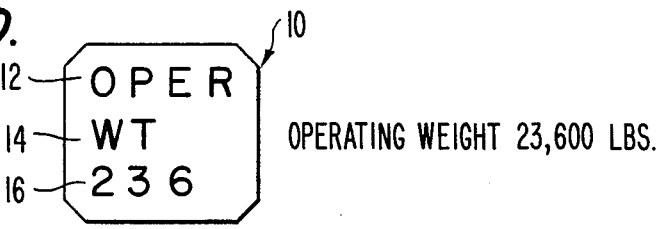
Figure 6E:
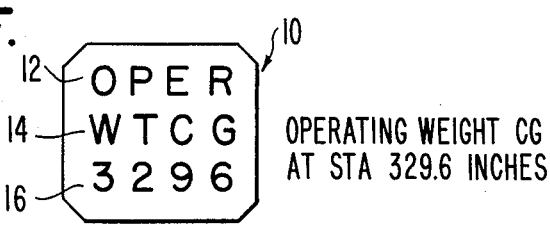
Figure 6F:
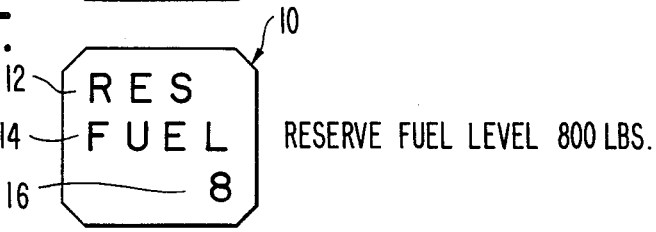
Figure 6G:
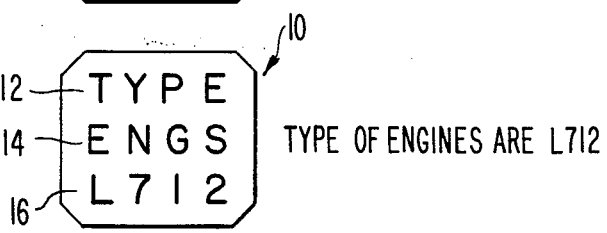

If a helicopter model series has different types of engines, different types of performance data will be required in the memory. FIG. 5G is used to identify the type of engines used for performance computation.

FIGS. 6A, 6B, 6C, 6D, 6F and 6G are examples of the display formats that would appear when the system is turned on and the SCROLL key is used to bring up displays. The original display format 5A will appear after the SCROLL key is used when FIG. 5G is displayed.

Figure 15:
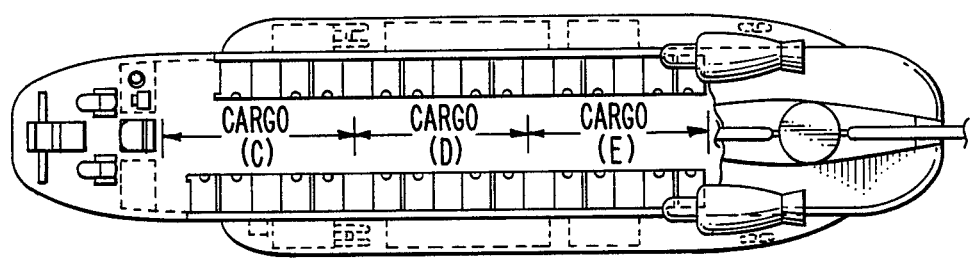
FIG. 15 illustrates the location of cargo compartments in an example application using a CH-47D helicopter.

The operator must manually enter the internal cargo load weight into the system processor prior to the lifting of the external sling load. This is accomplished by first engaging the INTERNAL LOAD switch 22 on the control panel 18 which brings up format FIG. 7A and then using the data entry keys CHG 34, SCROLL 36 and ENTER 38. The system automatically distributes the displayed internal cargo load weight evenly over the internal cargo compartments C, D and E which are shown in FIG. 15. This weight distribution may be viewed by pressing the SCROLL key and the display format would be as shown in 7B. If the internal cargo load weight is not distributed evenly, the operator would enter the unevenly distributed load by cargo compartment, into the processor using the SCROLL key 36 to bring up FIG. 7B format and the data entry keys CHG 34, SCROLL 36 and ENTER 38. FIGS. 8A and 8B illustrate an example of a 16,000 pound internal payload evenly distributed and FIG. 8C illustrates a non-evenly distributed internal payload.

Prior to lifting an external load, the operator would engage the sling load switch (SLING) 24. The display format that will appear is shown in FIG. 9A. As the external sling load is raised, the helicopter gross weight shown in the last three positions of line 12 of the display 10 would increase, as well as the total sling load weight shown in the last three positions of line 14 of the display 10.

The engine torque available for a limited time duration is displayed in the first two positions of line 16 of the display 10 and the engine torque available for sustained operation is displayed in the last two positions of line 16 of the display 10 as shown in FIG. 9A. These displayed torque available values automatically change as the outside air temperatures and pressure altitude change.

An example display without adverse helicopter center of gravity or hook load condition is shown in FIG. 10A.

Figure 16:
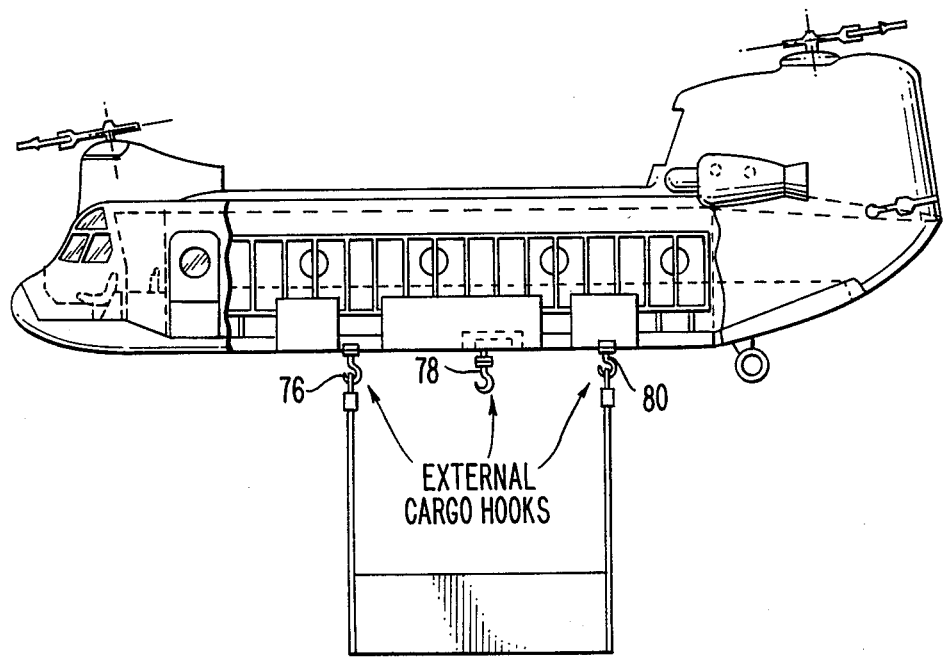
FIG. 16 illustrates the location of the external cargo hooks on the CH-47D helicopter.

If the helicopter gross weight limit is exceeded the displayed gross weight, last three positions of line 12 on display 10 FIG. 9A would flash. If an adverse helicopter balance (center of gravity) condition occurs, a "F" for forward CG limit condition or an "A" for aft CG limit condition would appear in the first position of line 12 of the display 10 FIG. 9A and the entire line would start flashing. If the weight limit of an external cargo hook, 76, 78 or 80 shown in FIG. 16 is exceeded when lifting a load, the hook that is overloaded will appear in the first position of line 14 of the display 10 FIG. 9A and the entire line 14 of the display 10 FIG. 9A will flash. An "A" in the first position would indicate forward hook 76, "C" the center hook 78 and "A" the aft hook 80. An example display of showing the helicopter forward CG limit exceeded and the forward cargo hook overload is shown in FIG. 10B.

To view the individual sling load weights, the operator would press the SCROLL key 36 and the display format 9B displaying the individual loads support by each hook would be displayed. Line 12 of display 10 in FIG. 9B indicates the forward hook position (F) and the weight it is supporting. Line 14 of display 10 in FIG. 9B indicates the center hook position (C) and the weight it is supporting. Line 16 of display 10 in FIG. 9B indicates the aft hook position (A) and the weight it is supporting. If any of the hook load weight limits are exceeded the weight value and its hook identification symbol (F, C, A) would flash. An example display is shown in FIG. 10C.

The scroll key is pressed again to view the optimum engine torque, line 12 of display 10, and the associated engine fuel flow rate, line 14 of display 10 for maximum range, as shown in FIG. 11A. The available engine torque for limited time and extended time operation will be displayed on line 16 of display 10, as shown in FIG. 11A. An example display for maximum range is FIG. 12A. The SCROLL key is pressed again to bring up the optimum engine torque, line 12 of display 10 and the associated engine fuel flow rate, line 14 of display 10 for maximum endurance time, as shown by FIG. 11B. The available engine torque for limited time and extended operations will be displayed on line 16 of display 10, as shown in FIG. 11B. An example display for maximum endurance time is FIG. 12B.

To return to the original sling load format display 9A, the operator would press the sling load switch (SLING) 24.

The destination switch (DEST) is used to determine the engine torque available versus engine torque required at the mission destination point based on the operating weight, and internal load in the systems processor's memory, the actual sling load, and the manually input anticipated remaining fuel weight, altitude and temperature at the mission destination point. When the destination switch 26 is engaged, the previously entered anticipated destination, altitude and air temperature would be displayed as shown in FIG. 13A and in the example FIG. 14A. These values may be changed by the operator using the data entry keys. Next, the operator would press the scroll key 36 to display the previously entered anticipated remaining fuel at destination value. This value may be changed by the operator using the data entry keys. The destination remaining fuel value is shown on line 14 of FIG. 13B and in the example FIG. 14B.

The available and required engine torque at destination are displayed on the third line 16 as noted in FIGS. 13B and 14B. The required torque will flash if it exceeds available torque.

The recall key RCL 28, on the control panel 18, is used to display the same data that appears when the system is turned on (FIG. 5). The test key, TEST 30, is used for built-in-test purposes. The calibration key CALB 32, is used to calibrate the system processor with the signals from each external cargo hook load cell, fuel flow system and altitude and air temperature indicators.

Changes may be made in the construction and arrangement of the parts or elements of the embodiments as described herein without departing from the spirit or scope of the invention defined in the following claims.

What is claimed is:

1. A weight and torque advisory system for a helicopter having an engine, a cell for containing fuel, space for internal cargo, hook means for carrying external cargo, load sensor means on said hook means, an engine fuel flow sensing means, an outside air temperature sensing means, and a pressure altitude sensing means, said advisory system comprising:

a computer including memory and processing means for real time calculation of operating data including helicopter fuel weight as a function of initial fuel load and engine fuel flow, helicopter gross weight as a function of operating weight, fuel weight and total cargo weight, helicopter gross weight center of gravity as a function of gross weight and weight distribution, helicopter available engine torque for limited and continuous operation as a function of air temperature and pressure altitude, and helicopter optimum engine torque and fuel flow rate for maximum range and endurance as a function of helicopter gross weight, air temperature and pressure altitude;

means connecting said load sensor means, fuel flow sensing means, temperature sensing means, and altitude sensing means to said computer for providing in real time sensed data including engine fuel flow rate, outside air temperature, pressure altitude, and external cargo weight and distribution;

manual means for inputting into said computer input data including helicopter initial fuel load, operating weight, operating weight center of gravity, and internal cargo weight and distribution;

display means for visually presenting selected displays of said operating, sensed and input data from said computer; and means for selecting said selected displays to be presented on said display means.

2. The system of claim 1 wherein said helicopter also includes an engine anti-ice system, wherein said system includes means connecting the anti-ice system to said computer for providing anti-ice system status, and wherein said memory and processing means calculates helicopter available engine torque as a function of air temperature, pressure altitude and engine anti-ice system status.

3. The system of claim 1 wherein said manual means also includes means for selectively inputting into said computer a desired reserve fuel weight.

4. The system of claim 3 wherein said computer includes means for generating a signal on said display means when said fuel weight is equal to said reserve fuel weight.

5. The system of claim 1 wherein said computer includes in memory performance data for different types of engines and wherein said manual means includes means for selecting the type of engine powering said helicopter.

6. The system of claim 1 wherein said memory and processing means includes means for generating a warning signal when any of helicopter gross weight, helicopter gross weight center of gravity, and external cargo weight exceeds a predetermined limit.

7. The system of claim 1 wherein said manual means includes means for selectively inputting into said computer pressure altitude, outside air temperature, and remaining fuel weight estimated to exist at a proposed destination and wherein said computer includes means for calculating the available and required torque at said destination and for generating a signal on said display means when said required torque exceeds said available torque at said proposed destination.

* * * * *